US006687378B1

(12) United States Patent
Nakamura

(10) Patent No.: US 6,687,378 B1
(45) Date of Patent: Feb. 3, 2004

(54) VEHICLE-MOUNTED ACOUSTIC SYSTEM

(75) Inventor: Yoshio Nakamura, Neyagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 390 days.

(21) Appl. No.: 09/786,051

(22) PCT Filed: Jul. 5, 2000

(86) PCT No.: PCT/JP00/04460

§ 371 (c)(1), (2), (4) Date: Jun. 5, 2001

(87) PCT Pub. No.: WO01/03471

PCT Pub. Date: Jan. 11, 2001

(30) Foreign Application Priority Data

Jul. 6, 1999 (JP) .......................................... 11-191445

(51) Int. Cl.$^{7}$ ................................................ H04B 1/00

(52) U.S. Cl. ............................ 381/86; 381/17; 381/18; 381/20

(58) Field of Search ............................ 381/86, 17, 18, 381/27, 303, 19, 20, 21, 22, 23

(56) References Cited

U.S. PATENT DOCUMENTS 5,546,465 A * 8/1996 Kim ............................ 381/18

FOREIGN PATENT DOCUMENTS

| | | | | |
|---|---|---|---|---|
| JP | 4-61999 | | 5/1992 | |
| JP | 9-65500 | | 3/1997 | |
| JP | 10-91390 | | 4/1998 | |
| JP | 10-210599 | | 8/1998 | |
| JP | 410210599 A | * | 8/1998 | ............ H04S/5/02 |

* cited by examiner

*Primary Examiner*—Melur Ramakrishnaiah
(74) *Attorney, Agent, or Firm*—Wenderoth, Lind & Ponack, L.L.P.

(57) ABSTRACT

A car-borne sound system that reproduces a recorded multi-channel music source in the 5. 1 system or the like system into a natural sound environment in a room of an automobile. Conventionally, at a driver's seat or at a front passenger seat, a sound image of vocal sounds (singing voice) was locating deviated from the natural placement. The present sound system eliminates such unnatural sound image positioning. A front center signal and a front right and a front left signals, which include much of the vocal components, are added on to a rear right and a rear left signals so that rear speakers (106 and 107) also reproduce the vocal components. Thus the vocal sound image is placed and fixed in the central place to provide a natural listening environment.

7 Claims, 10 Drawing Sheets

VEHICLE-MOUNTED ACOUSTIC SYSTEM

TECHNICAL FIELD

Digital media have been widely used. Some automobiles use recorded multi-channel music sources for reproduction in the passenger room. The present invention relates to a car-borne sound system for reproducing multi-channel music sources in high quality sound.

BACKGROUND ART

Taking advantage of recent digital recording media of high recording capacity, for example a DVD Audio, it has become popular to record music in multi-channel way with an aim for improving the feeling of presence at audience. The multi-channel systems in practical use include; the 5-channel system where the recorded channels are reproduced respectively by the speakers disposed at the front right, the front, the front left, the rear right and the rear left of a listener. A so-called 5. 1 channel system, which is provided with a sub-channel recording only low frequency range sound components, has also been made available.

In the home-use sector, a sound system that offers sounds with a superior feeling of presence by reproducing sound signals through speakers disposed at a front right, a front center, a front left, a rear right and a rear left of audience plus a speaker exclusive for low frequency range sound reproduction has already been developed and in practical use. On the other hand, development activities regarding a car-borne sound system for reproducing the multi-channel music sources in a room of an automobile with a superior feeling of presence have just started.

FIG. 10 shows a conventional sound system for reproducing the recorded multi-channel sound sources in a room of an automobile, based on the above-described 5. 1 channel system. A reproduction apparatus 1001 reproduces a 5. 1 channel music source into electric signals; a front right signal and a front left signal are supplied respectively to a front right speaker 1003 and a front left speaker 1004, while a rear right signal and a rear left signal are supplied respectively to a speaker 1005 disposed in the rear right door and a speaker 1006 disposed in the rear left door. As to a front center signal, in some cases it is supplied for reproduction to a speaker 1002 disposed in the center of a dashboard. However, it is often very difficult to provide a speaker in the center of a dashboard. In such a case, the front center signal is added on to the front right and the front left signals, as an exemplary compensation, so that the speakers 1003 and 1004 disposed in the front right door and the front left door reproduce also the front center signal components.

When placing speakers in an automobile, the front speakers are normally disposed in the front right door and the front left door and the rear speakers in the rear right door and the rear left door (or, at the right and the left of a rear tray). Under the above speaker layout, a conventional stereo signal reproduction system supplies the right-channel signal to the speakers disposed in the front right door and the rear right door (or, at the right of tray), and the left-channel signal to the speakers in the front left door and the rear left door (or, at the left of tray), for reproduction of sound. It is obvious that the basic role for the speakers disposed in the rear doors or the tray is to provide passengers sitting in the rear seat with sounds for their listening. At the same time, the rear speakers bear an important function of improving the sound quality and the sound image perceived by those who are sitting in the driver's seat and the front seat.

The reason: in the normal case where the speakers are mounted only in the front right door and the front left door and a stereo signal is reproduced therefrom, listening point in the front seat is either at the driver's seat or the front passenger seat, which is substantially off the center between the right and the left speakers. The listening point in this case is deviating greatly to the right, or to the left. Under such condition, much time lag and much difference in the sound pressure are perceived at a listening point between the sound waves reaching from the right and the left speakers; as the result, the sound image is positioned at a point which is very close to a speaker adjacent to the listening point.

This phenomenon of sound image deviation is significant with the monaural signal components contained among the right and the left signals of a stereo source. A human vocal sound, which is consisting mainly of monaural components and should naturally be located in the middle of the right and the left speakers, is positioned at a location adjacent to either one of the right and the left speakers. This causes an unnatural feeling with a listener.

When the same stereo signals as above are reproduced also from the speakers in the rear doors, or in the rear tray, the sound fields are moderately stirred and the difference in the time of arrival and the sound pressure at a listening point (driver's seat or front passenger seat) between the right and the left sound waves is eased, as compared with the case when sounds are reproduced only from the speakers in the front right door and the front left door. The human vocal sound (human singing sound) which contains much monaural components is not heard deviated to either one of the speakers. It sounds naturally, with the sound image fixed in a central zone.

As described above, it is of a substantial importance, in the making of natural vocal sound in a car room, to additionally provide the rear right speaker and the rear left speaker disposed in the rear doors, or in the rear tray, with the same signals as those supplied to the speakers of the front right door and the front left door, or adding an influential monaural signal component.

In the multi-channel sound recording system (5. 1 channel system), vocal components are recorded mainly in the front center signal and the right and the left front signals. When the music source is reproduced in an automobile room using a conventional system as shown in FIG. 10, the vocal components are reproduced only from the speakers in the front right door and the front left door. Then, as s described earlier regarding the logic of stereophonic sound reproduction in a car room, the time lag and the difference in sound pressure at a listening point between the sound waves arriving from the speakers remain significant, and the vocal sound image is positioned unnaturally deviating to a place adjacent to either one of the speakers.

DISCLOSURE OF THE INVENTION

The present invention addresses the above-described drawbacks, and aims to provide a car-borne sound system that can reproduce a music source with the vocal sounds at a natural positioning.

A car-borne sound system of the present invention comprises:

a 5-channel music source recorded for reproduction through the speakers disposed in the front center, in the front right, in the front left, in the rear right and the rear left of a listener, or a 4-channel music source recorded for reproduction through the speakers disposed in the front right, in the front left, in the rear right and the rear left of a listener;

- a reproduction apparatus for reproducing the music source into electric signals;
- a signal processing apparatus for processing the multi-channel signals supplied from the reproduction apparatus; and
- a plurality of speakers disposed within a room of an automobile for radiating sound outputs based on the multi-channel electric signals delivered from the signal processing apparatus.

In the car-borne sound system of the present invention, the signal processing apparatus delivers an output signal for the rear right after adding a part of the front signals such as the front center signal, the front right signal and the front left signal, which contain much of the vocal components, on the rear right signal supplied from the reproduction apparatus. And it delivers an output signal for the rear left after adding a part of the front signals such as the front center signal, the front right signal and the front left signal on the rear left signal supplied from the reproduction apparatus. In this way, car-borne sound systems of the present invention reproduces high quality sound environment rich in the feeling of presence in a car room taking advantage of the multi-channel sound source, without causing the unnatural positioning of vocal sound image which was considered unavoidable with conventional car-borne sound systems.

BEST MODE FOR CARRYING OUT THE INVENTION

First Embodiment

Figure 1:
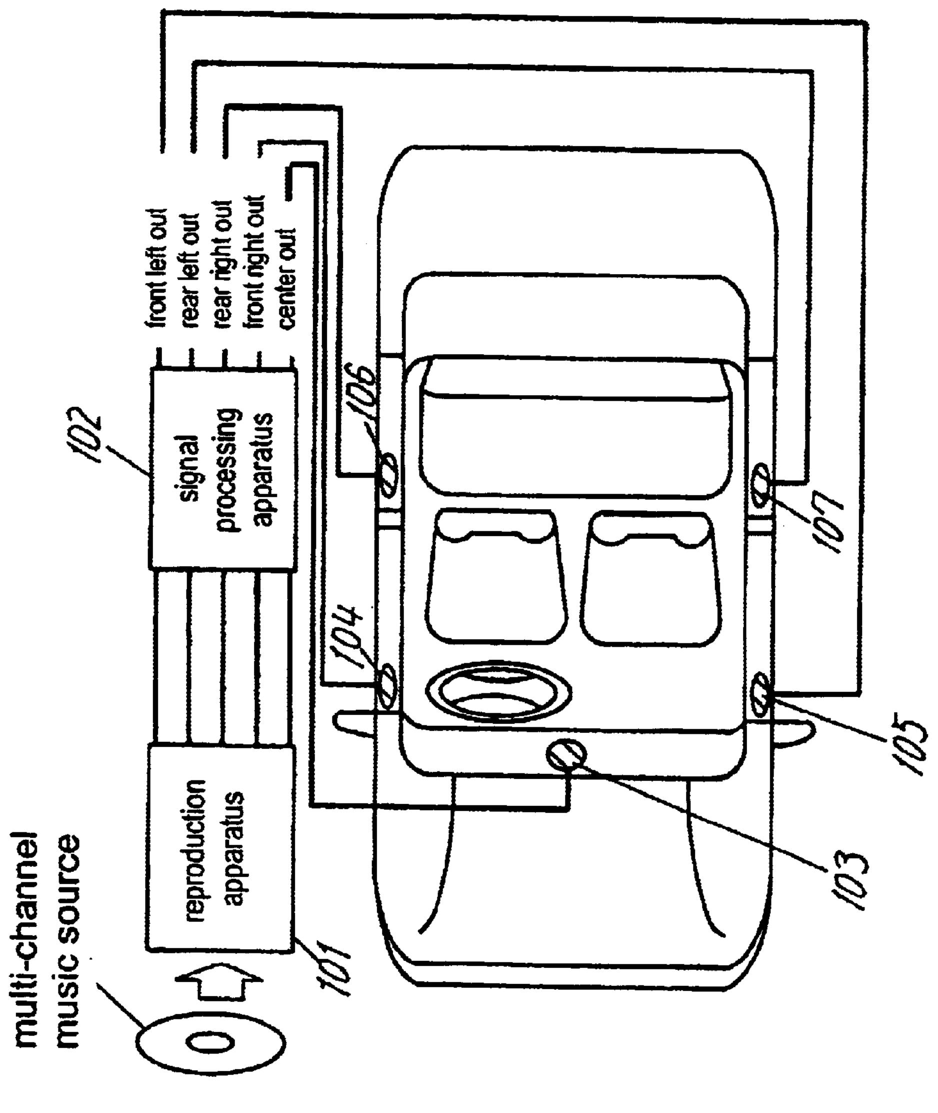
FIG. 1 shows an example of a structure of a car-borne sound system in accordance with a first exemplary embodiment of the present invention.

FIG. 1 shows structure of a car-borne sound system in accordance with a first exemplary embodiment of the present invention. Referring to FIG. 1, a reproduction apparatus 101, a DVD player for example, reproduces a recorded multi-channel music source into electric signals, a signal processing apparatus 102 processes the multi-channel electric signals reproduced from the recorded multi-channel music source by the reproduction apparatus 101. Speakers 103–107 are mounted in a car for radiating the output signals delivered from the signal processing apparatus in the form of sound inside the car room. The speaker 103 is disposed in the center, or the vicinity, of car dashboard for radiating in the room a front center output signal delivered from the signal processing apparatus 102. The speaker 104 is mounted in the front right door, or the like place, for radiating in the room a front right output signal delivered from the signal processing apparatus 102. The speaker 105 is mounted in the front left door, or the like place, for radiating in the room a front left output signal delivered from the signal processing apparatus 102. The speaker 106 is mounted in the rear right door, or the like place, for radiating in the room a rear right output signal delivered from the signal processing apparatus 102. The speaker 107 is mounted in the rear left door, or the like place, for radiating in the room a rear left output signal delivered from the signal processing apparatus 102.

Figure 2:
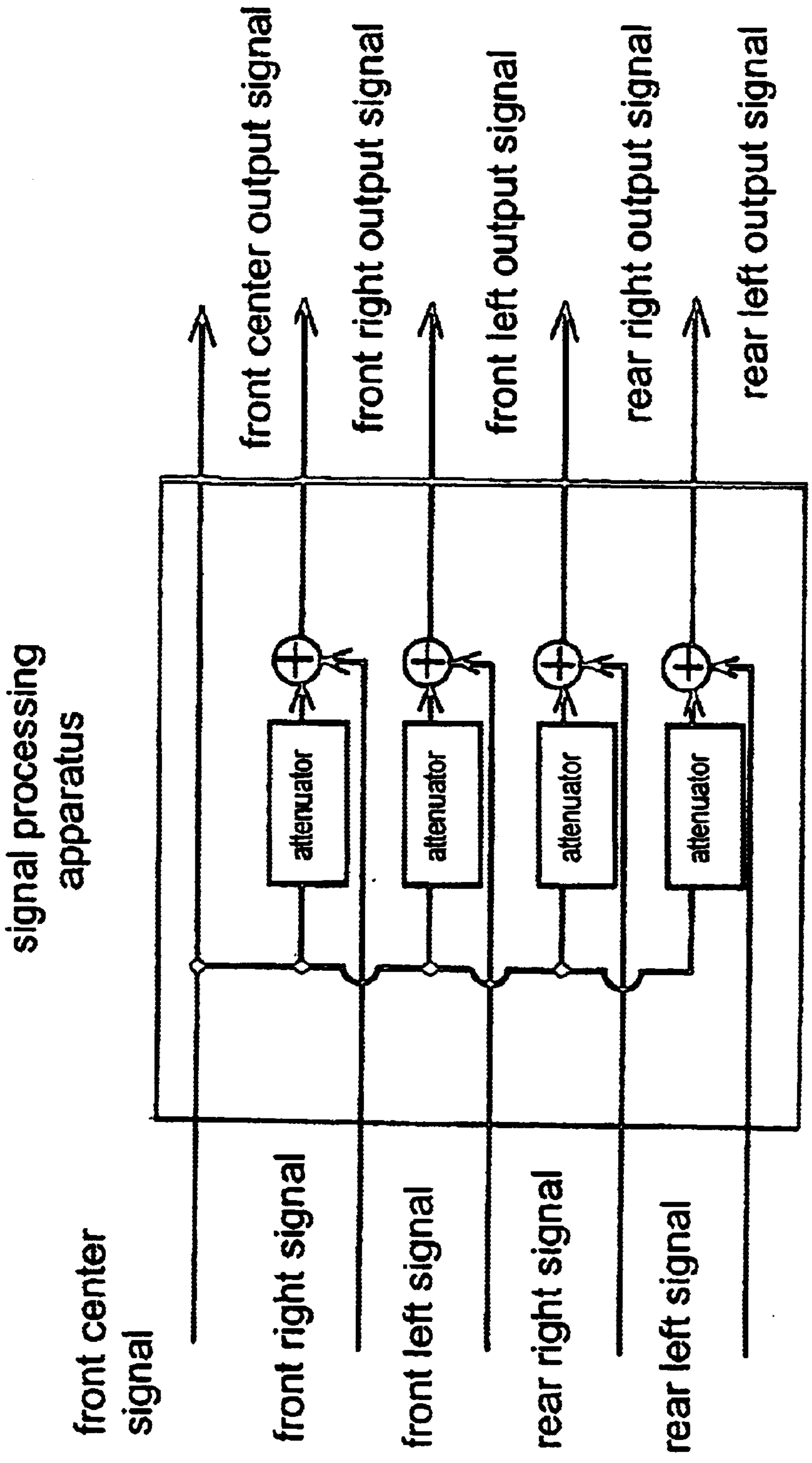
FIG. 2 shows a first example of signal processing apparatus in the car-borne sound system of the first exemplary embodiment.
Figure 3:
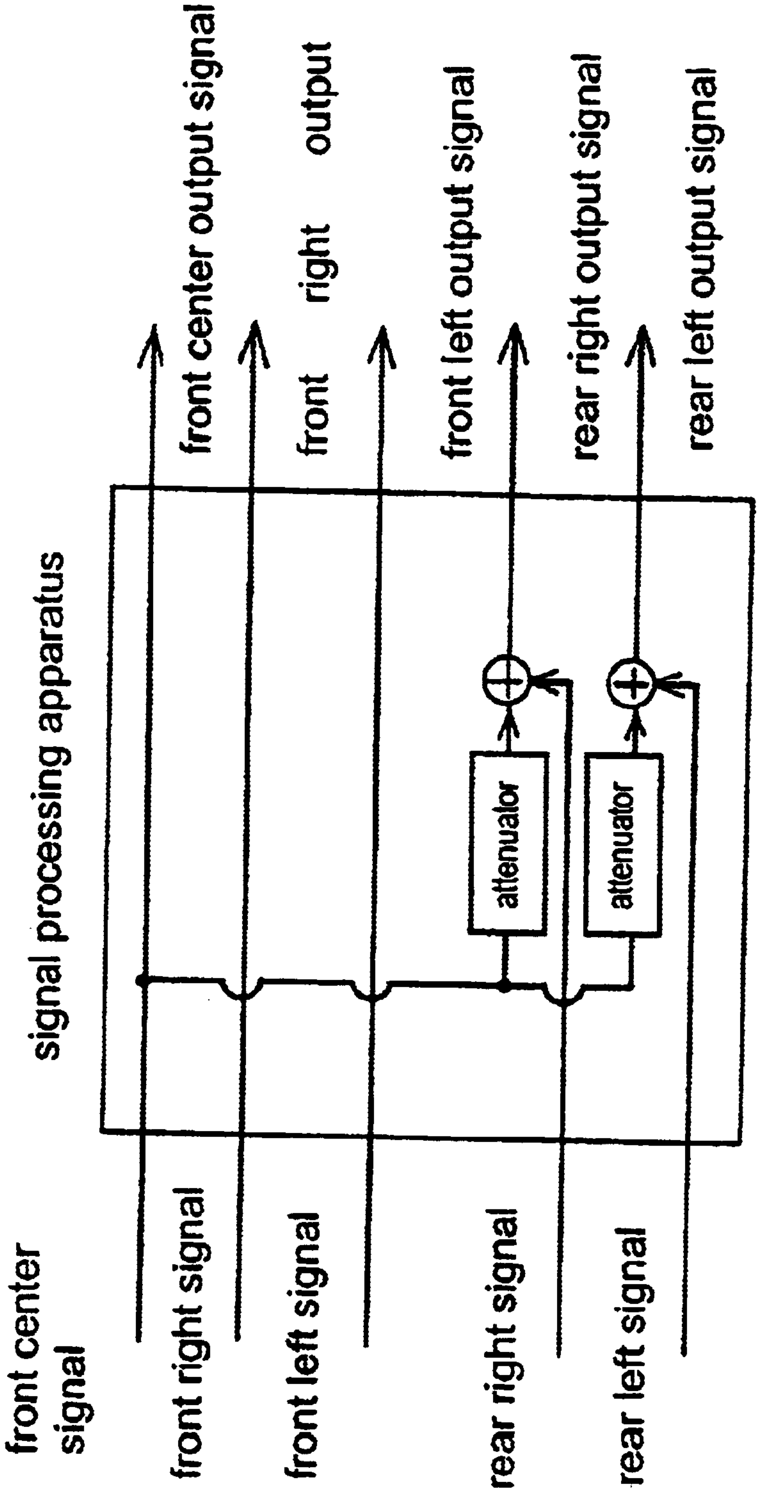
FIG. 3 shows a second example of signal processing apparatus in the car-borne sound system of the first exemplary embodiment.
Figure 4:
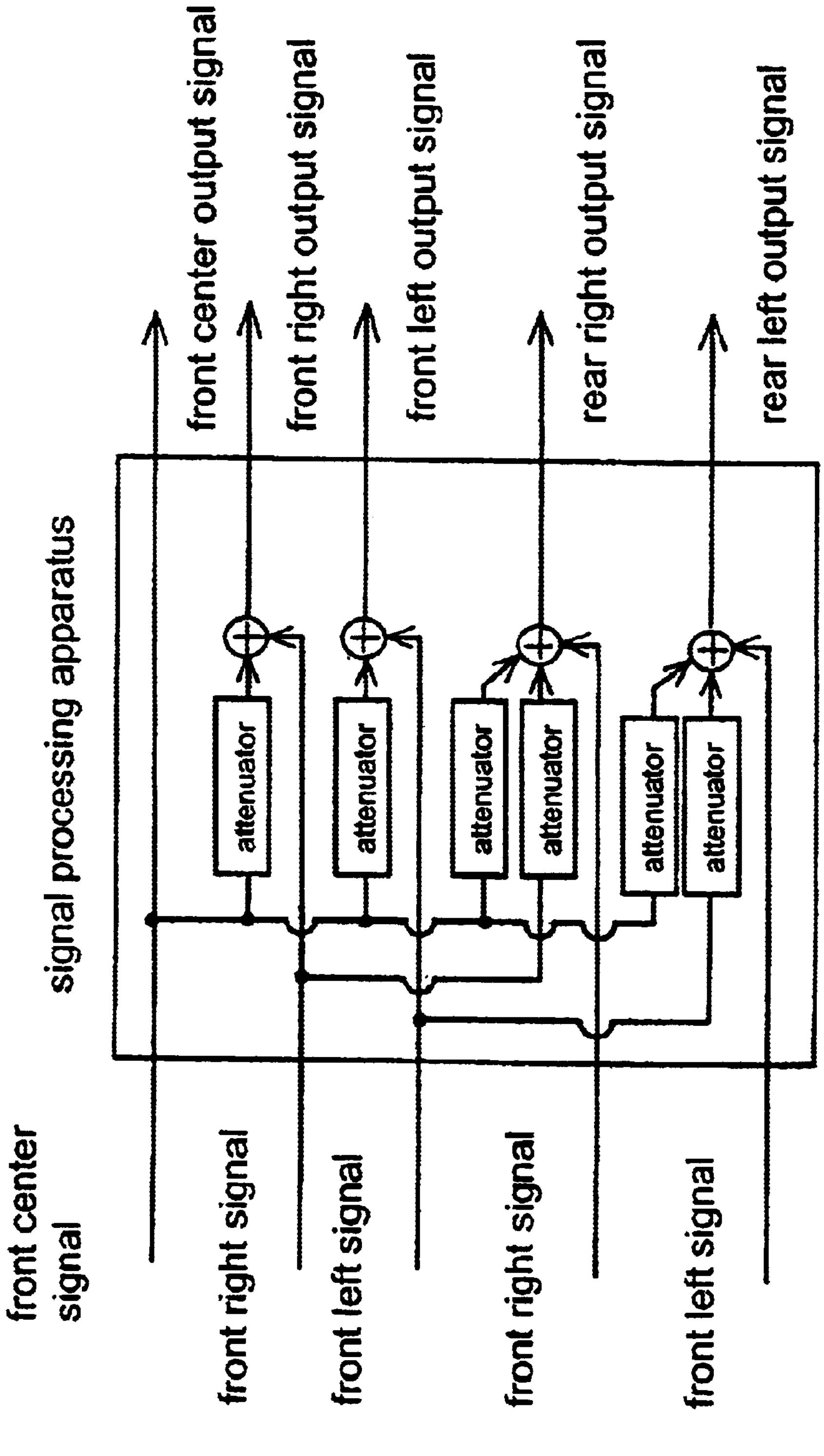
FIG. 4 shows a third example of signal processing apparatus in the car-borne sound system of the first exemplary embodiment.
Figure 5:
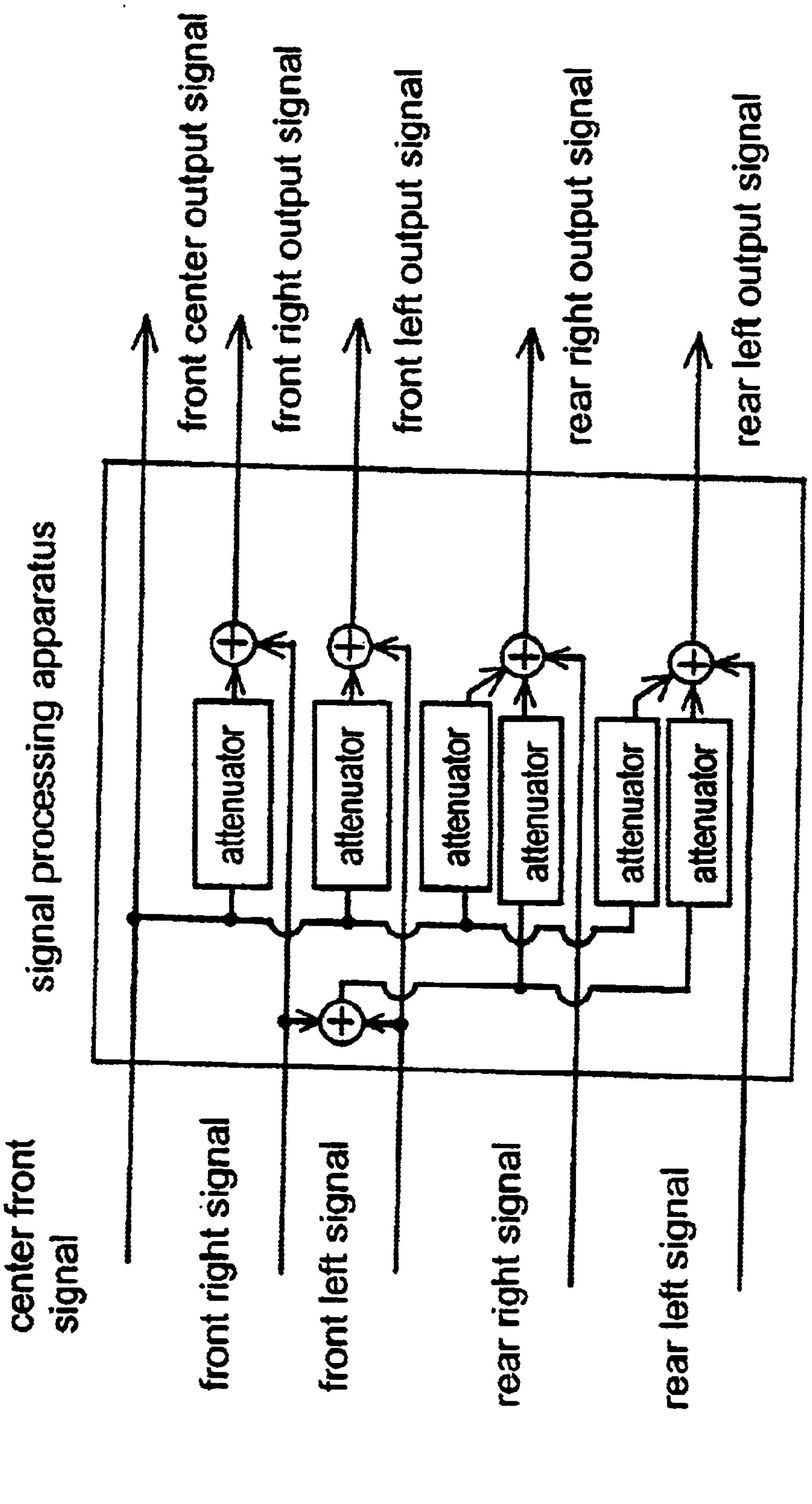
FIG. 5 shows a fourth example of signal processing apparatus in the car-borne sound system of the first exemplary embodiment.
Figure 6:
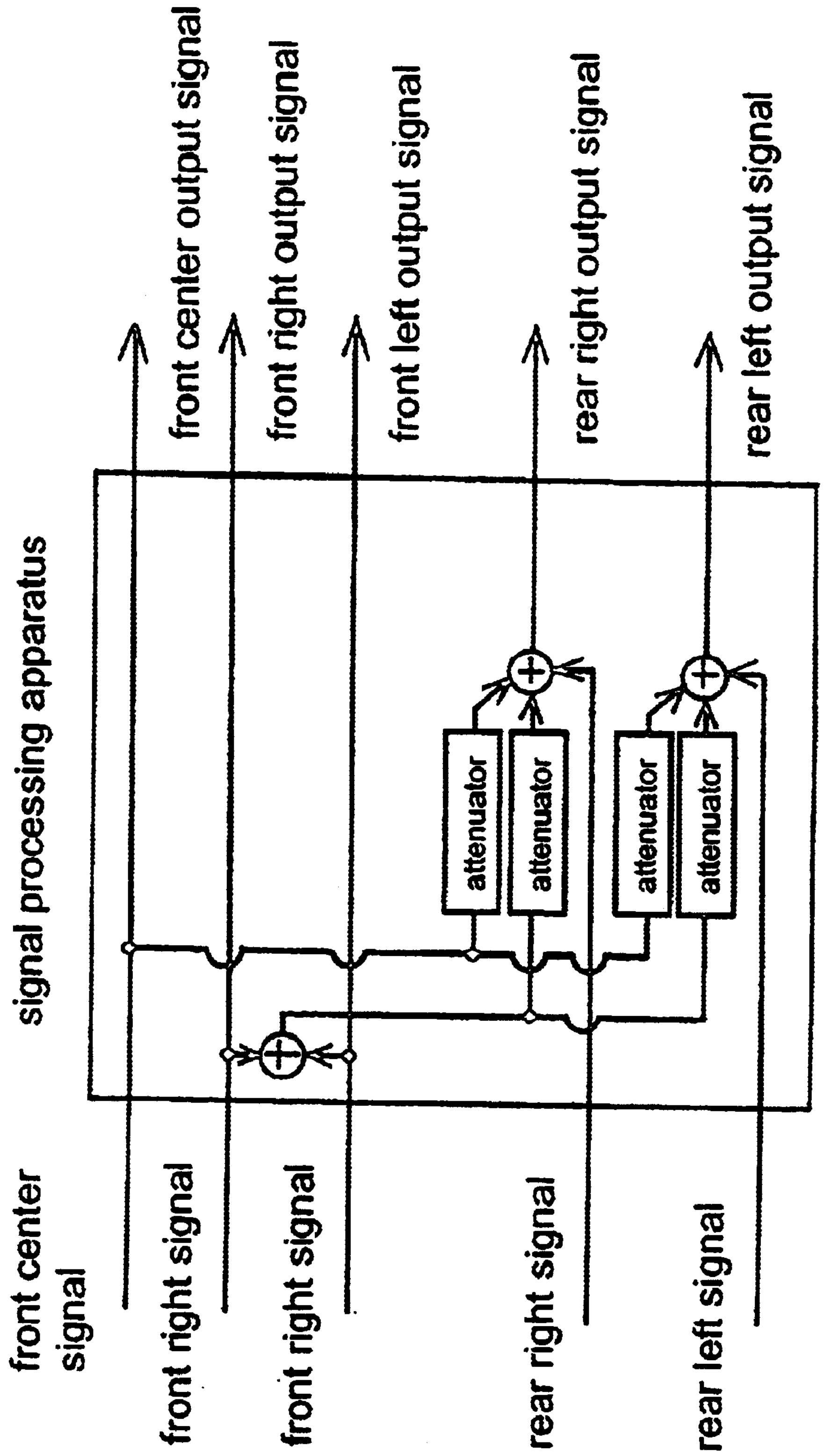
FIG. 6 shows a fifth example of signal processing apparatus in the car-borne sound system of the first exemplary embodiment.

FIG. 2 shows a first practical example of the signal processing apparatus 102, used to describe how the signals are processed. The structure shown in FIG. 2 corresponds to claim 1. FIG. 3 shows a second practical example of the signal processing apparatus 102, used to describe how the signals are processed. The structure shown in FIG. 3 corresponds to claim 2. FIG. 4 shows a third practical example of the signal processing apparatus 102, used to describe how the signals are processed. The structure shown in FIG. 4 corresponds to claim 3. FIG. 5 shows a fourth practical example of the signal processing apparatus 102, used to describe how the signals are processed. The structure shown in FIG. 5 corresponds to claim 4. FIG. 6 shows a fifth practical example of the signal processing apparatus 102, used to describe how the signals are processed. The structure shown in FIG. 6 corresponds to claim 5.

In the following, the operation in the first embodiment is described.

Referring to FIG. 1, a recorded multi-channel source is reproduced in the form of a front center electric signal, a front right electric signal, a front left electric signal, a rear right electric signal and a rear left electric signal by the reproduction apparatus 101. The multi-channel electric signals are processed by the signal processing apparatus 102 into a front center output signal, a front right output signal, a front left output signal, a rear right output signal and a rear left output signal, to be delivered respectively to the speakers 103–107 for sound reproduction. The signal processing apparatus 102 has a structure, for example, as shown in FIG. 2. The front center signal from the reproduction apparatus 101 is treated as it is and delivered as the front center output signal. The front right signal is processed by adding a part of the front center signal and delivered as the front right output signal. The front left signal is processed by adding a part of the front center signal and delivered as the front left output signal. The rear right signal is processed by adding a part of the front center signal and delivered as the rear right output signal. And the rear left signal is processed by adding a part of the front center signal and delivered as the rear left output signal.

Under the above-described structure, part of the front center signal, in which much of the vocal components are included, is supplied to all of the speakers. As a result, the vocal components are reproduced as sounds even from the rear speakers 106 and 107. In this way, the present invention eliminates the unnatural positioning of vocal sounds that was considered unavoidable with the conventional systems. It provides a superior sound environment rich in the feeling of presence taking advantage of the recorded multi-channel sound source, with the vocal sound image positioned and fixed in the central place.

FIG. 1 contains a speaker 103 for radiating the front center output signal in the form of sound. In many of the practical cases, it is difficult to have a speaker mounted in a dashboard. So, in a case without the speaker 103, the same effects can be created by adding more amounts of the front center signal components on the front right and left output signals .

The difference existing among FIGS. 3–6 is in the structure of the signal process in apparatus 102. The difference is in the way how much amount of the front center signal component, the front right signal component and the front left signal component, which include much of the vocal components, are added on to the rear signals. The principle of operation and function remains the same, so the description is omitted here.

Second Embodiment

Figure 7:
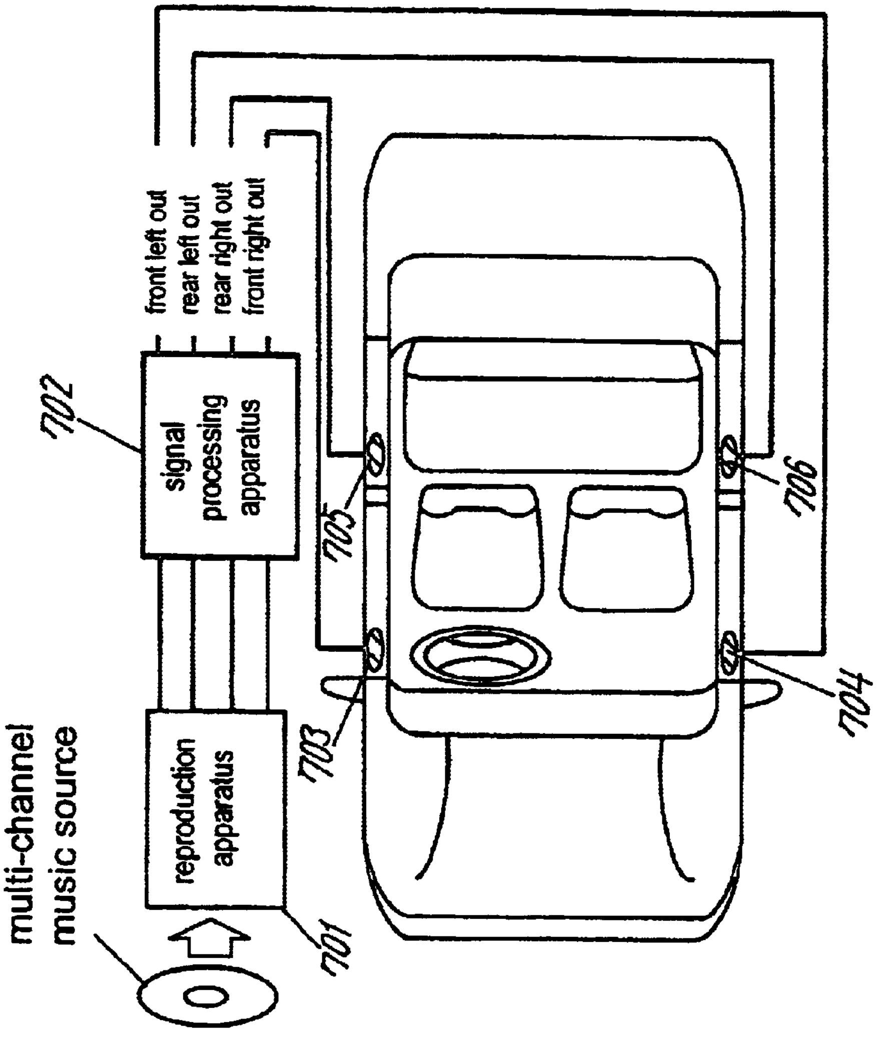
FIG. 7 shows an example of the structure of car-borne sound system in accordance with a second exemplary embodiment of the present invention.

FIG. 7 shows structure of a car-borne sound system in accordance with a second exemplary embodiment of the present invention. Referring to FIG. 7, a reproduction apparatus 701, a DVD player for example, reproduces a recorded multi-channel music source into electric signals, a signal processing apparatus 702 processes the multi-channel electric signals reproduced from the recorded multi-channel source by the reproduction apparatus 701. Speakers 703–706 are mounted in a car for radiating the output signals delivered from the signal processing apparatus in the form of sound in a room of the automobile. The speaker 703 is mounted in the front right door, or the like place, for radiating in the room the front right output signal delivered from the signal processing apparatus 702. The speaker 704 is mounted in the front left door, or the like place, for radiating in the room the front left output signal delivered from the signal processing apparatus 702. The speaker 705 is mounted in the rear right door, or the like place, for radiating in the room the rear right output signal delivered from the signal processing apparatus 702. The speaker 706 is mounted in the rear left door, or the like place, for radiating in the room the rear left output signal delivered from the signal processing apparatus 702.

Figure 8:
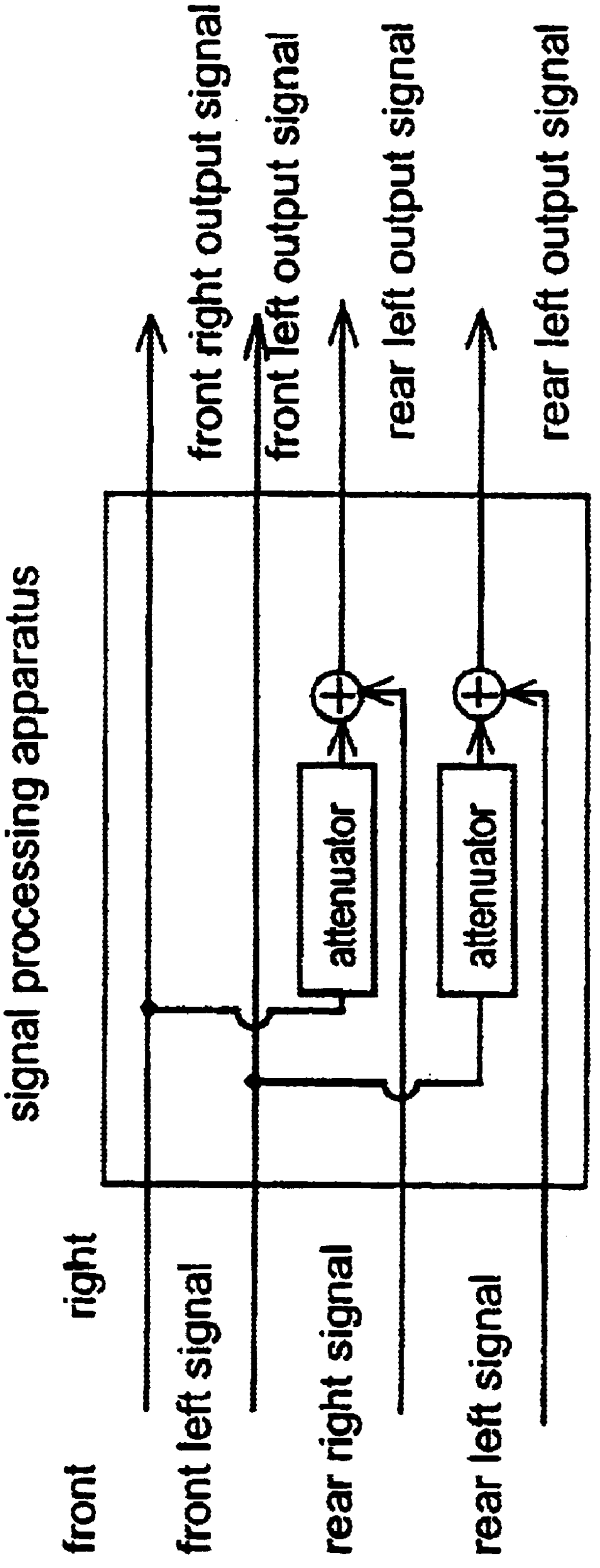
FIG. 8 shows a first example of signal processing apparatus in the car-borne sound system of the second exemplary embodiment.
Figure 9:
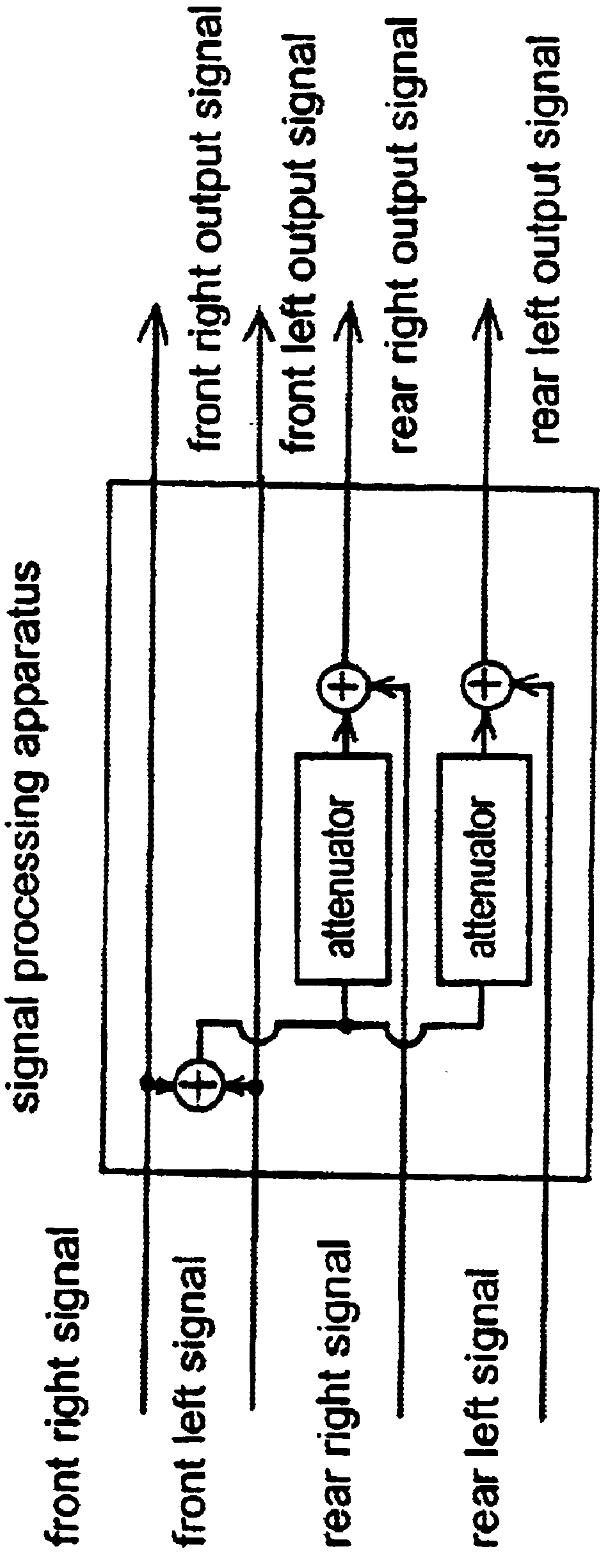
FIG. 9 shows a second example of signal processing apparatus in the car-borne sound system of the second exemplary embodiment.
Figure 10:
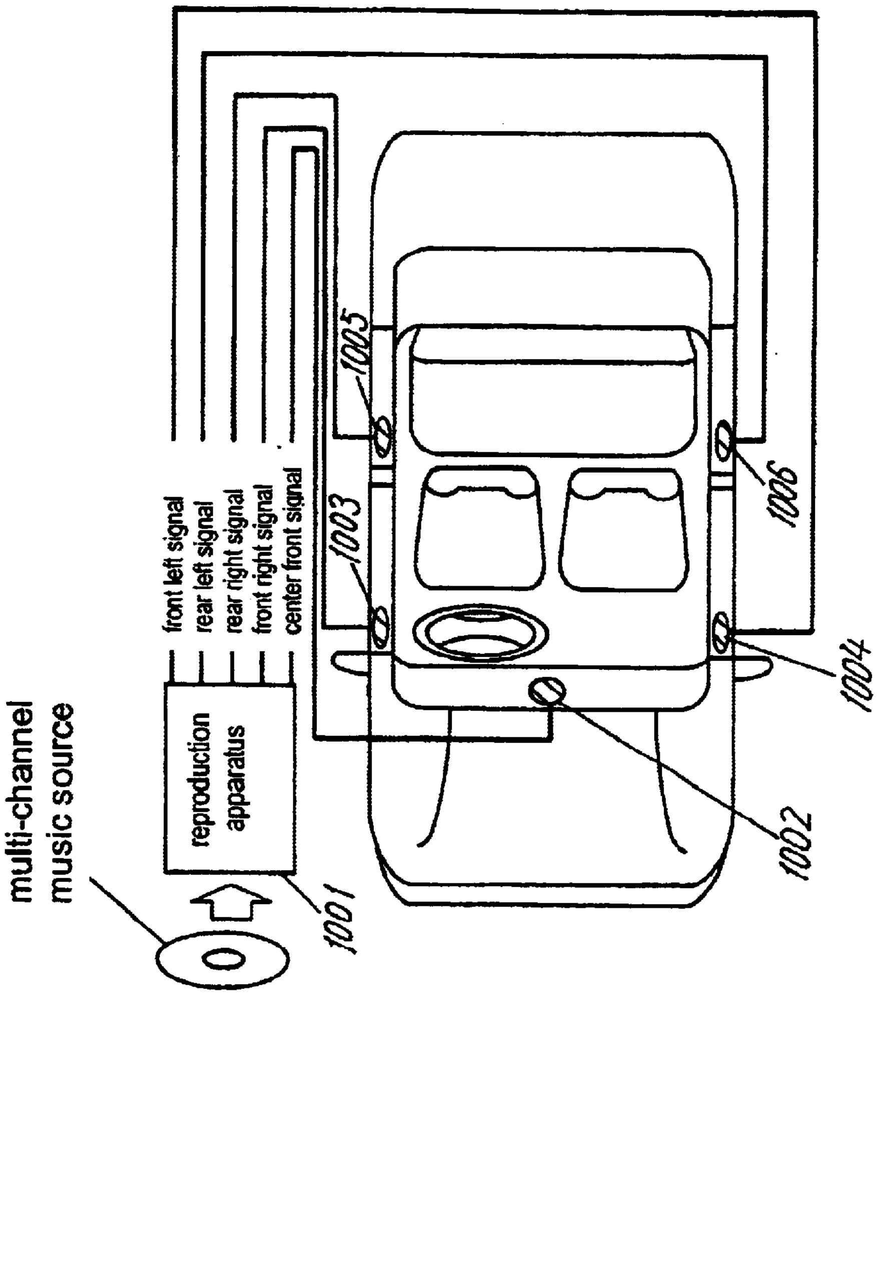
FIG. 10 Prior Art
FIG. 10 shows a structure of a conventional sound system used to reproduce a multi-channel music source in a room of an automobile.

FIG. 8 shows a first practical example of the structure of signal processing apparatus 702, which corresponds to claim 6. FIG. 9 shows a second practical example of the structure of signal processing apparatus 702, which corresponds to claim 7.

Now in the following, the operation in the second exemplary embodiment is described.

Referring to FIG. 7, a recorded multi-channel music source is reproduced in the form of a front right electric signal, a front left electric signal, a rear right electric signal and a rear left electric signal by the reproduction apparatus 701. The multi-channel electric signals are processed by the signal processing apparatus 702 into a front right output signal, a front left output signal, a rear right output signal and a rear left output signal, to be delivered respectively to the speakers 703–106 for sound reproduction. The signal processing apparatus 702 has a structure, for example, as shown in FIG. 8. The front right signal and the front left signal are treated as they are and delivered respectively as the front right output signal and the front left output signal. The rear right signal is processed by adding a part of the front right signal and delivered as the rear right output signal. The rear left signal is processed by adding a part of the front left signal and delivered as the rear left output signal.

Under the above-described structure, part of the front right signal and the front left signal, which include much of the vocal components, are supplied to the rear speakers 705, 706. As the result, the vocal components are reproduced as sounds also from the rear speakers 705 and 706. In this way, the present invention eliminates the unnatural positioning of vocal sounds that was considered unavoidable with the conventional systems. It provides a superior sound environment rich in the feeling of presence taking advantage of the recorded multi-channel sound source, with the vocal sound image positioned and fixed in the central place.

The difference with FIG. 9 is in the structure of the signal processing apparatus 702; the difference is in the way how the front right signal and the front left signal, which include much of the vocal components, are added on to the rear signals. The principle of operation and function remains the same, so the description is omitted here.

INDUSTRIAL APPLICABILITY

The car-borne sound system of the present invention eliminates the unnatural positioning of vocal sound image, which was considered unavoidable because location arrangement of the listening points in a room of an automobile is unique. It reproduces a multi-channel music source in a superior sound environment rich in the natural feeling of presence by taking advantage of the source recorded in the multi-channel way, with the vocal sound image positioned in the central place.

What is claimed is:

1. A car-borne sound system comprising:

a multi-channel music source recorded for reproduction through speakers disposed at least in the front center, in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the respective multi-channel electric signals delivered from the signal processing apparatus, wherein said signal processing apparatus processes the signals of music source reproduced by said reproduction apparatus in a way that the front center signal is treated as it is and delivered as a front center output signal, the front right signal is processed by adding a part of the front center signal and delivered as a front right output signal, the front left signal is processed by adding a part of the front center signal and delivered as a front left output signal, the rear right signal is processed by adding a part of the front center signal and delivered as a rear right output signal, and the rear left signal is processed by adding a part of the front center signal and delivered as a rear left output signal.

2. A car-borne sound system comprising:

a multi-channel music source recorded for reproduction through speakers disposed at least in the front center, in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front center signal, the front right signal and the front left signals are treated as they are and delivered respectively as a front center output signal, a front right output signal and a front left output signal, the rear right signal is processed by adding a part of the front center signal and delivered as a rear right output signal, and the rear left signal is processed by adding a part of the front center signal and delivered as a rear left output signal.

3. A car-borne sound system comprising:

a multi-channel music source recorded for reproduction through speakers disposed at least in the front center, in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front center signal is treated as it is and delivered as a front output signal, the front right signal is processed by adding a part of the front center signal and delivered as a front right output signal, the front left signal is processed by adding a part of the front center signal and delivered as a front left output signal, the rear right signal is processed by adding a part of the front center signal and a part of the front right signal and then delivered as a rear right output signal, and the rear left signal is processed by adding a part of the front center signal and a part of the front left signal and then delivered as a rear left output signal.

4. A car-borne sound system comprising:

a multi-channel music source recorded for reproduction through speakers disposed at least in the front center, in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front center signal is treated as it is and delivered as a front center output signal, the front right signal is processed by adding a part of the front center signal and delivered as a front right output signal, the front left signal is processed by adding a part of the front center signal and delivered as a front left output signal, the rear right signal is processed by adding a part of the front center signal and a part of sum of the front right signal and the front left signal and then delivered as a rear right output signal, and the rear left signal is processed by adding a part of the front center signal and a part of sum of the front right signal and the front left signal and then delivered as a rear left output signal.

5. A car-borne sound system comprising:

a multi-channel music source recorded for reproduction through speakers disposed at least in the front center, in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front center signal, the front right signal and the front left signals are treated as they are and delivered respectively as a front center output signal, a front right output signal and a front left output signal, the rear right signal is processed by adding a part of the front center signal and a part of sum of the front right signal and the front left signal and then delivered as a rear right output signal, and the rear left signal is processed by adding a part of the front center signal and a part of sum of the front right signal and the front left signal and then delivered as a rear left output signal.

6. A car-borne sound system comprising:

a multi-channel music source recorded for reproduction through speakers disposed at least in the front right, in the front left, in the rear right and in the rear left of a listener;

a reproduction apparatus for reproducing the music source into electric signals;

a signal processing apparatus for processing the multi-channel signals delivered from the reproduction apparatus; and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front right signal and the front left signal are treated as they are and delivered respectively as a front right output signal and a front left output signal, the rear right signal is processed by adding a part of the front right signal and delivered as a rear right output signal, and the rear left signal is processed by adding a part of the front left signal and delivered as a rear left output signal.

7. A car-borne sound system comprising:

a multi-channel music source recorded for reproduction through speakers disposed at least in the front right, in the front left, in the rear right and in the rear left of a listener;

a reproduction apparatus for reproducing the music source into electric signals;

a signal processing apparatus for processing the multi-channel signals delivered from the reproduction apparatus;

and a plurality of speakers disposed in a room of an automobile for radiating sound of the multi-channel electric signals delivered from the signal processing apparatus, wherein said signal processing apparatus processes the signals of music source reproduced by said reproduction apparatus in a way that the front right signal and the front left signal are treated as they are and delivered respectively as a front right output signal and a front left output signal, the rear right signal is processed by adding a part of sum of the front right signal and the front left signal and then delivered as a rear right output signal, and the rear left signal is processed by adding a part of sum of the front right signal and the front left signal and then delivered as a rear left output signal.

* * * * *